United States Patent [19]
Fathauer et al.

[11] 3,723,989
[45] Mar. 27, 1973

[54] ELECTRONIC PLANTER MONITOR

[75] Inventors: George H. Fathauer; David F. Fathauer, both of Decatur, Ill.

[73] Assignee: Dickey-john Corporation, Chatham, Ill.

[22] Filed: Feb. 12, 1970

[21] Appl. No.: 10,930

[52] U.S. Cl...............340/259, 250/215, 250/222 M
[51] Int. Cl..............................................G08b 21/00
[58] Field of Search..........340/259, 239, 258 B, 267; 250/222 M, 215, 215 X, 205, 217; 221/21, 312, 17, 7; 128/214; 235/92 V, 92 PC; 222/23, 23 X, 76, 76 X

[56] References Cited

UNITED STATES PATENTS

| | | | |
|---|---|---|---|
| 3,537,091 | 10/1970 | Schenkenberg | 221/7 |
| 3,527,928 | 9/1970 | Ryder et al. | 340/267 R |
| 3,197,068 | 7/1965 | Corbin et al. | 128/214 |
| 2,654,879 | 10/1953 | Jackson | 340/239 |
| 3,370,285 | 2/1968 | Cruse et al. | 340/258 B |
| 3,456,155 | 7/1969 | Buchanan | 250/205 |
| 3,317,680 | 5/1967 | Porter | 179/100.2 T |
| 2,557,186 | 6/1951 | Hamacher | 328/49 |
| 3,018,440 | 1/1962 | Cumings | 328/48 |

Primary Examiner—John W. Caldwell
Assistant Examiner—Glen R. Swann, III
Attorney—Olson, Trexler, Wolters & Bushnell

[57] ABSTRACT

A seed planting apparatus is disclosed for planting seeds concurrently in a plurality of rows including bin assemblies or hoppers for releasing a plurality of seeds along a path of travel and at a preselected rate. The apparatus includes a detecting circuit associated with each bin assembly or hopper for electrically detecting the plurality of seeds. A source of light is mounted on one side of the path of travel and a photocell is mounted on the other side of the path of travel optically aligned with the source of light. The photocell emits an electrical signal when a seed passes between the photocell and source of light. A monitoring device is also included and is responsive to the electrical signal for monitoring the plurality of seeds.

21 Claims, 10 Drawing Figures

Patented March 27, 1973 3,723,989

Inventors
George H. Fathauer
David F. Fathauer
By Olson, Trexler, Wolters & Bushnell attys.

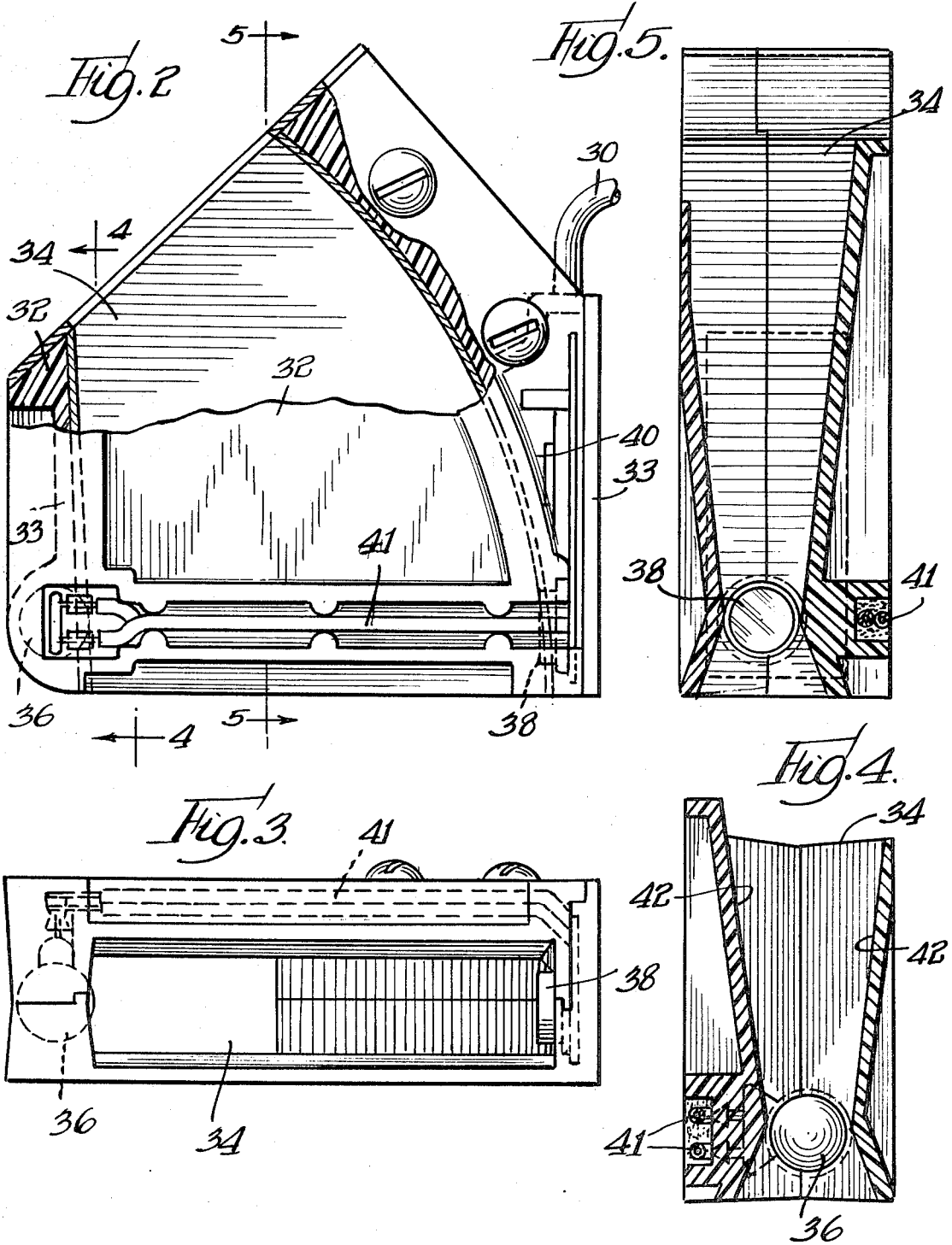

Patented March 27, 1973
3,723,989
4 Sheets-Sheet 3
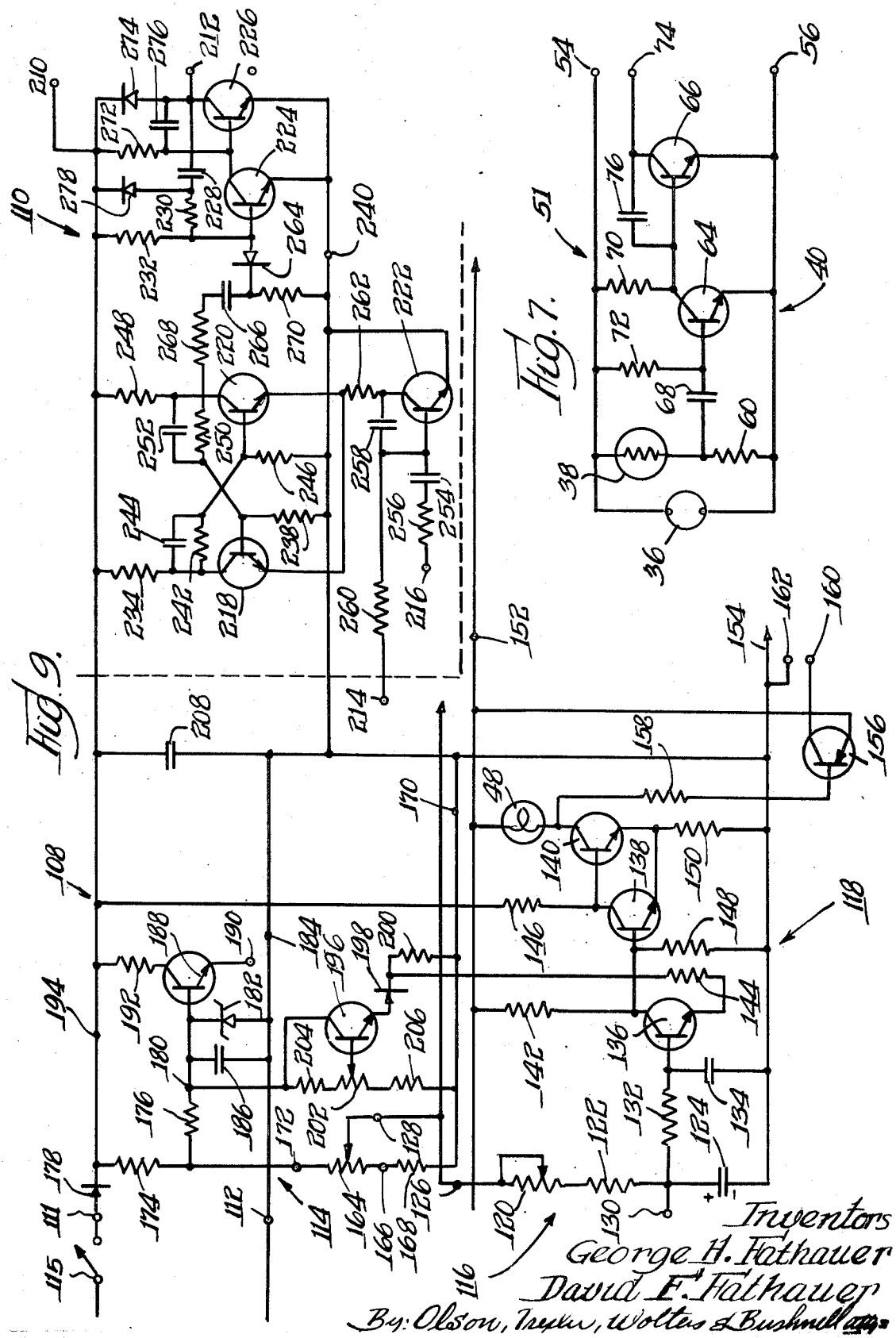

Inventors
George H. Fathauer
David H. Fathauer
By: Olson, Trexler, Wolters & Bushnell attys.

ELECTRONIC PLANTER MONITOR

The present invention relates to a novel monitoring apparatus, and more specifically to a novel apparatus for monitoring the passage of discrete articles. While certain features of this invention may be adapted for many different uses, the disclosure will be facilitated by directing it particularly to the problem of monitoring seeds being discharged by a planter.

As is well known, a farmer engaged in mechanized planting of various seeds utilizes a planting machine pulled behind a tractor. Such planting machines usually include a plurality of separate planting devices supplied with seed from separate hoppers so that a plurality of rows of seed may be planted at one time. With planting equipment heretofore in general use, it has usually been difficult if not impossible for a farmer to determine the rate at which seeds are being planted during the actual planting operation and there have been many instances where one or more of the planting units have failed to plant any seed at all due to a breakdown, an empty hopper or the like without the farmer knowing it.

It is an important object of the present invention to provide a novel apparatus whereby the operation of planting equipment may be continuously and accurately monitored for enabling a farmer instantly to determine whether or not the seeds are being planted properly.

A more specific object of the present invention is to provide a novel apparatus substantially responsive to each seed or group of seeds dispensed by a planting unit for enabling an operator to determine the manner in which said unit is functioning.

A further important object of the present invention is to provide a novel seed monitoring apparatus adapted to be installed in association with a planter for enabling an operator to determine the seed population being planted.

A further important object of the present invention is to provide a novel monitoring apparatus capable of accurately and reliably responding to and sensing the passage of discrete articles such as seeds at relatively high speeds.

A further important object of the present invention is to provide a novel monitoring apparatus of the above-described type which is of simple and rugged construction and may be easily installed in association with a seed planter.

A further important object of the present invention is to provide a novel monitoring apparatus of the above-described type which apparatus includes a novel circuit for detecting the presence of discrete articles such as seeds.

A more specific object of the present invention is to provide a novel detecting circuit which includes a light source, photocell and amplifier circuit all of which are positioned in close proximity to the articles or seeds being detected whereby to increase the reliability of the detecting function.

A further important object of the present invention is to provide a novel monitoring apparatus of the above-described type which includes a novel monitoring circuit for monitoring the detected articles or seeds.

A more specific object of the present invention is to provide a novel monitoring circuit which includes both visual and audible monitoring means.

Yet another important object of the present invention is to provide a novel monitoring apparatus of the above-described type which includes a novel circuit for counting detected articles.

A more specific object of the present invention is to provide a novel counting circuit which has means for counting only one detected particle or seed of a predetermined plurality of particles detected.

Other objects and advantages of the present invention will become apparent from the following description of the accompanying drawings wherein:

FIG. 2 is a side elevational view of an assembly for directing seeds from a hopper with the top portion shown in partial section, which hopper is part of the seed planting apparatus, the assembly including a circuit for detecting seeds passing therethrough;

FIG. 3 is a bottom plan view of FIG. 2;

FIG. 4 is a sectional view taken along line 4—4 of FIG. 2;

FIG. 5 is a sectional view taken along line 5—5 of FIG. 2;

FIG. 7 is an electrical schematic view of a first embodiment of a detection circuit incorporating features of the present invention;

FIG. 9 is an electrical schematic view of a first embodiment of a monitoring circuit in combination with a counting circuit incorporating features of the present invention; and, FIG. 10 is an electrical schematic view of a second embodiment of a monitoring circuit in combination with a counting circuit.

Figure 6:
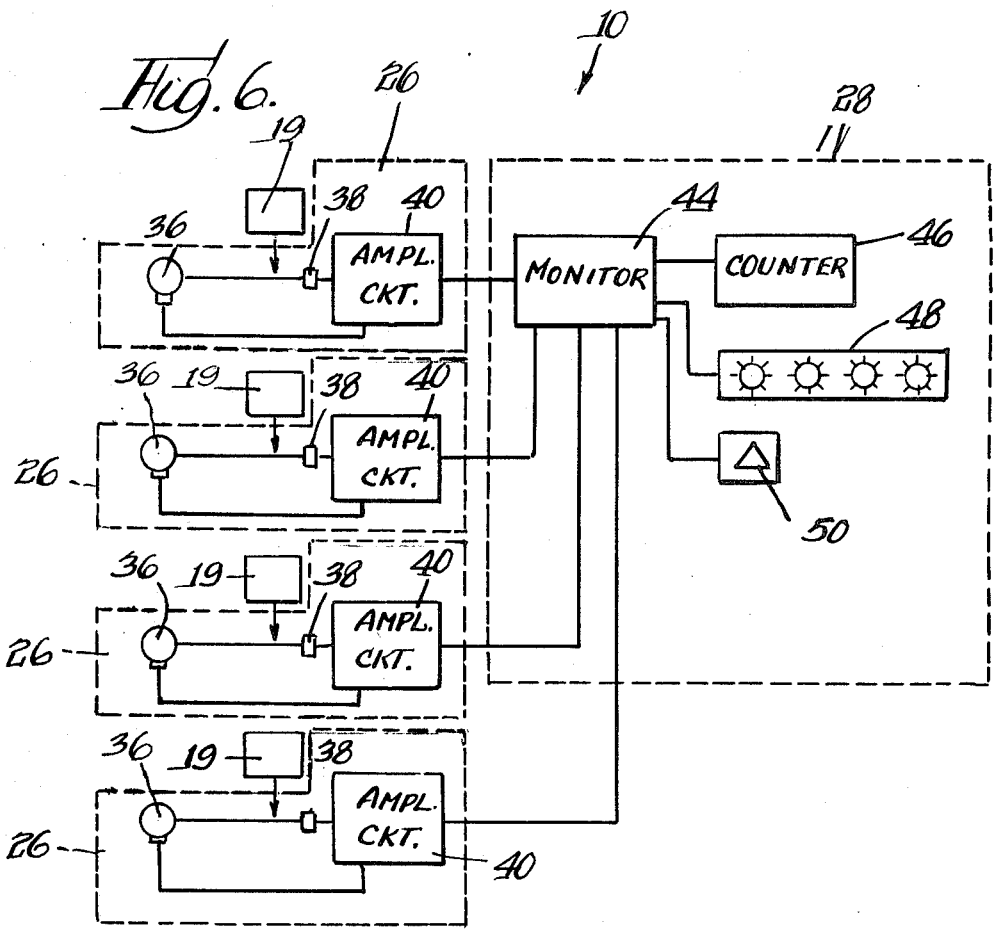
FIG. 6 is a block diagram of the overall monitoring apparatus for monitoring four rows of seeds to be planted.
Figure 1:
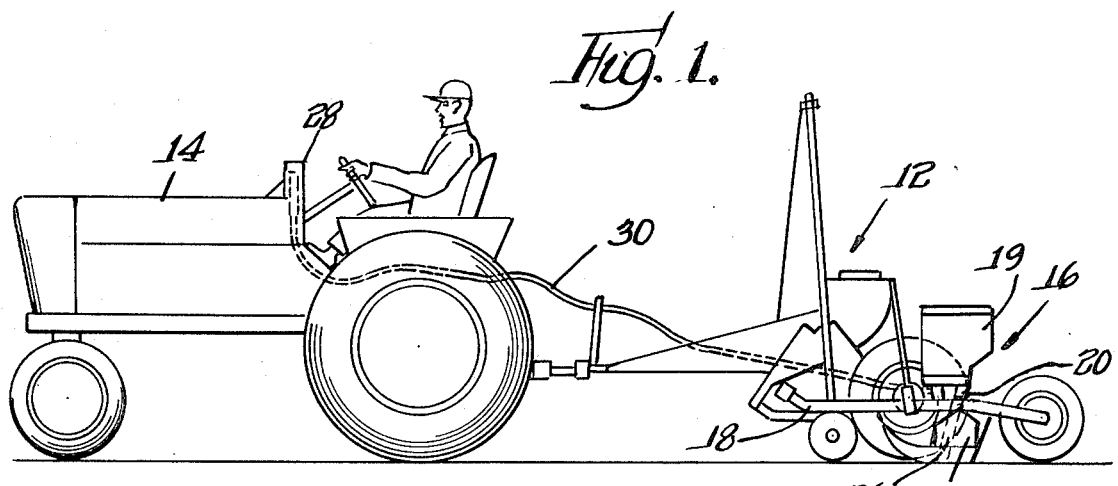
FIG. 1 is a side elevational view of a seed planter in combination with a tractor and a monitoring apparatus incorporating features of the present invention.

Referring now more specifically to the drawings wherein like parts are designated by the same numerals throughout the various figures, a seed monitoring apparatus 10 shown in FIG. 6 is adapted to be installed in association with a planter 12 pulled by a tractor 14 as shown in FIG. 1. Turning specifically to FIG. 1, the planter 12 and tractor 14 may be of various known constructions and need not be described in detail. It suffices to state that the planter 12 includes a plurality of planting units 16 mounted on frame 18. In the particular embodiment shown for the purpose of illustrating one form of this invention, the seed monitoring apparatus 10 is constructed for association with a planter 12 having four planting units 16 (only one unit being shown in FIG. 1). It is understood, however, that the seed monitoring apparatus 10 may be adapted for association with planters having any desired number of planting units.

Each of the planting units 16 may also be of various known constructions and need not be described in detail. In general, each planting unit 16 comprises a bin assembly or hopper 19 for storing a supply of seed and a valve or feeding mechanism 20 at the lower end of the hopper for delivering seed, one at a time, into an upper end of an associated assembly housing or boot 22 forming a part of the seed monitoring apparatus 10 as will be described more in detail below. The associated assembly housing or boot 22 is mounted adjacent to and below its corresponding planting unit 16 for directing seed ultimately to the ground for planting purposes.

As will be described in detail with respect to FIGS. 2 through 5, a detecting device 26 for detecting seed flow within the assembly housing or boot 22 is mounted within and to the boot. The seed monitoring apparatus 10 comprises not only the assembly housing or boot 22 and detecting device 26 but also a control and indicating panel 28 adapted to be mounted at a convenient location on the tractor 14. Electrical cables 30 are provided for electrically and detachably connecting the control and indicating panel 28 and detecting device 26. It is to be understood that each bin assembly or hopper 19 and corresponding assembly housing or boot 22 has an associated detecting device 26 for detecting seed flow within its corresponding boot.

Turning to FIGS. 2 through 5, a detailed cross-sectional portion of assembly housing or boot 22 is shown in combination with the detecting device 26 which will be described hereinafter. The assembly housing or boot 22 comprises an open ended downwardly extending housing having front and back wall portions 32 and side wall portions 33 which define a vertically and arcuately extending opening 34 for passage of the seeds therethrough, the uppermost open end thereof cooperating with the valve or feeding mechanism 20 of a corresponding bin assembly or hopper 19.

The detecting device 26 includes a source of light 36 such as an incandescent lamp, which lamp is positioned within the assembly housing or boot 22 and at the exit or bottom portion of the boot and mounted on a side wall 33 thereof. The detecting device 26 further includes a photocell 38 which is laterally spaced from the source of light 36 and mounted on an opposite side wall 33 within the assembly housing or boot 22 such that a seed from bin assembly or hopper 19 passes between the source of light 36 and photocell 38. The photocell 38 is optically aligned with the source of light or lamp 36 and generates an electrical signal when a seed passes between the two, as will be described in greater detail hereinafter. Also included within the assembly housing or boot 22 is an amplifier circuit 40, which amplifier circuit also comprises part of the detecting device 26. The amplifier circuit 40 is mounted adjacent to the photocell 38 and amplifies the previously mentioned signal which is emitted by the photocell. As can be seen in FIG. 2, the electrical cable 30 connecting the detecting device 26 and control and indicating panel 28 extends from within the housing on a side thereof. Additional electrical cables 41 connect the light source 36 to the photocell 38 and amplifier circuit 40 and are mounted along a front wall 32 outside the assembly housing or boot 22. It is to be noted that the amplifier circuit 40 is mounted adjacent the photocell 30 rather than being mounted adjacent the remotely positioned control and indicating panel 28. Since the electrical cables 41 are extremely short as compared to longer cables which would be required if the amplifier circuit was remotely positioned, electrical noise within the cables is substantially reduced. This in turn allows for a more accurate detecting device 26.

The assembly housing or boot 22 also includes two laterally spaced and longitudinally extending guide panels or plates 42 which aid in directing the flow of seeds through the assembly housing or boot such that the seeds will pass directly between the photocell 38 and light source 36. As seen in FIGS. 4 and 5, the guide panels or plates 42 extend from the upper open end of the assembly housing or boot 22, on opposite sides thereof, and inwardly taper, reaching maximum inward tapers at points between the light source 36 and photocell 38 and thereafter outwardly tapered. It is to be noted that the guide panels or plates 42, at their maximum taper, are spaced apart with respect to each other so as to force the downwardly falling seeds to be positioned between the light source 36 and photocell as stated above.

Turning to FIG. 6, a block diagram of the seed monitoring apparatus 10 is shown, excluding the assembly housing or boot 22. As stated above the seed monitoring apparatus 10 includes a detecting device 26 for each row of seeds to be planted. In the example shown in FIG. 6, four detecting devices are shown. A block diagram of a control and indicating panel 28 is also included as part of the seed monitoring apparatus 10 as stated above.

The control and indicating panel 28 includes a monitoring device 44 which will be described in more detail with respect to FIGS. 9 and 10, a counting device 46 which also will be described in detail with respect to FIGS. 9 and 10, a plurality of indicating lamps 48 for purposes described below and an audible indicating alarm 50 such as a siren or horn.

The plurality of detecting devices 26 each includes a light source 36, photocell 38 and amplifier circuit 40 which are positioned within their respective assembly housing or boot 22 as stated above so that a seed passes therebetween, from an associated bin assembly or hopper 19 as indicated by arrows in FIG. 6.

In operation, it is desired to release a plurality of seeds from the bin assembly or hopper 19 in a preselected numerical rate, for example 500 or 600 seeds per minute so that the seeds to be planted are properly spaced with respect to each other as the operator drives tractor 14. This may be done by the operator by means not shown and will be referred to hereinafter as the set seed flow rate. Once the seed flow rate has been set or established for bin assembly or hoppers 19, the monitoring device 44 is appropriately adjusted, as will be described hereinafter, so as to emit an electrical signal which corresponds to the set seed flow rate.

As each seed passes between the photocell 38 and light source 36, a signal is emitted through the amplifier circuit 40 and to the monitoring device 44. This signal co-operates with the signal developed by the monitoring device 44 for ultimately indicating a variation between the set seed flow rate and the actual seed flow rate, which latter flow rate is determined by the amount of seed actually detected in a given period of time.

The counter 46 is energized by a circuit included in monitoring device 44 so that the counter only counts one seed detected by the detector 26 for a predetermined plurality of preceding seeds detected. Standard circuit means (not shown) are provided to connect counter 46 to any one of the plurality of detecting devices 26 for counting the seeds released from that detecting device's corresponding bin assembly or hopper 19.

In one embodiment of the invention herein disclosed, the plurality of indicating lamps 48, each of which corresponds with a respective planting unit 16, and audible indicating device 50 remain in their de-energized or "off" state as long as the actual seed flow rate or detected flow rate is identical to or greater than the set seed flow rate which set flow rate corresponds to the above stated signal emitted from monitoring device 44. If the actual or detected flow rate of a particular planting unit 16 goes below the set flow rate, the monitoring device 44 appropriately energizes the corresponding indicating lamp 48 and audible indicating device or alarm 50. This in turn warns the operator that there is a malfunction or the like at the particular planting unit.

In a second embodiment no set seed flow rate exists and no adjustment is made to monitoring device 44. Rather, as each seed passes between its respective photocell 38 and light source 36, a signal which is initiated by the photocell and amplified by a corresponding amplifier circuit is delivered to the monitoring device 44 for energizing a corresponding indicating lamp 48. In other words, assuming each bin assembly or hopper 19 is feeding seeds, a corresponding indicating lamp 48 will continue to flash on and off for indicating the passing of seeds between corresponding light source 36 and photocell 38. If a particular hopper is clogged or the like such that no seeds pass between the photocell 38 and light source 36, the corresponding indicating lamp 48 will remain de-energized. This de-energized state actuates the audible indicating device or alarm 50 a predetermined period of time after the light has gone from its energized to de-energized state, for warning the operator.

Turning to FIG. 7, a first embodiment of an electrical circuit 51 for the detecting device 26 is shown. The device includes the light source 36 connected across two input terminals each of which is designated by the numerals 54 and 56 respectively. The photocell 38 is optically aligned with the light source 36 as stated above and electrically connected at one side intermediate the light source and input terminal 54. The other side of photocell 38 is connected to input terminal 56 through a resistor 60 which resistor makes up a part of the amplifier circuit or amplifier switching circuit 40, the amplifier circuit also being electrically connected across the input terminals 54 and 56.

The amplifier switching circuit 40 includes a first transistor 64 and a second transistor 66. The base of transistor 64 is connected through a capacitor 68 to a point intermediate the photocell 38 and resistor 60. The collector of transistor 64 is connected through a resistor 70 to a point intermediate input terminal 54 and the photocell 38 while the transistor's emitter is connected to a point intermediate the input terminal 56 and the light source 36. A resistor 72 has one side connected intermediate the base of transistor 64 and capacitor 68 with its other side connected intermediate resistor 70 and photocell 38.

The transistor 66 has its base connected intermediate resistor 70 and the collector of transistor 64, its emitter connected to the input terminal 56 and its collector connected to an output terminal 74. A capacitor 76 connects the base and collector of transistor 66.

In operation, a direct current supply (not shown) of approximately 9 volts is connected to input terminal 54 with input terminal 56 as common. This results in a direct current voltage or operating voltage in the order of four volts at the left side of capacitor 68 as viewed in FIG. 7. The transistor 64 is maintained in a conductive or turned on state by current which passes through resistor 72 and to the base of transistor 64. With the aid of resistor 70 and capacitor 76, this in turn properly biases the transistor 66 so that this transistor is maintained in a non-conductive or off state when the transistor 64 is in an on state. As a seed or other discrete article passes between the photocell 38 and light source 36 causing the light intensity on the photocell to instantaneously decrease, the internal photocell resistance increases proportionately which in turn lowers the voltage at the left side of capacitor 68. This voltage change or decrease in operating voltage at capacitor 68 properly biases the transistor 64 so that the transistor goes from its initial on state to an off state which turns on transistor 66. While transistor 66 remains in its on state, an electrical signal develops through the transistor and at the output terminal 74. This signal, as stated above, may be used in conjunction with the monitoring device 44 described with respect to FIG. 6. It is to be noted that as a plurality of seeds are detected by photocell 38 a plurality of signals will appear at the output terminal 74. This plurality of signals will, hereinafter, be referred to as the output signal frequency of the detecting device 26.

An important feature of the circuit is the use of capacitor 68 and its associated resistors 60, 70 and 72 to differentiate the input signal thereby producing a relatively short time turn off of transistor 64 and turn on of transistor 66, even though the decrease in level of ambient light on the photocell 38 may be of relatively long duration. This is of importance under conditions of variation in ambient light levels which occur with accumulation of dirt, temperature changes, components aging, etc. Additionally, resistor 72 is chosen to provide sufficient on current to transistor 64 to override noise signals which might otherwise be sensed. The capacitor 76 is incorporated to establish high frequency response preventing parasitic oscillations.

To put the above in other words, the mere change or decrease in ambient light level on photocell 38 is not the prerequisite for initiating a signal at output terminal 74. Rather, a differential or change in voltage of sufficient predetermined magnitude at capacitor 68 is required. The magnitude of this differential or change in voltage is dependent not only upon a sufficient change in ambient light level but also upon the values of capacitor 68 and resistors 60, 70 and particularly resistor 72. The mere accumulation of dirt on the photocell 38, temperature changes, component agings, etc. which attribute to increasing the internal resistance of photocell 38 and, thus decreasing the voltage at capacitor 68 is not sufficient, practically speaking, to turn off transistor 64 but merely lowers the operating voltage at capacitor 68. It is to be understood that the mere accumulation of dirt or the like on photocell 38 causing the voltage at capacitor 68 to be maintained at a lower level does not effect the magnitude of voltage change required to initiate a signal as described above. Therefore, the detecting device 26 will properly function so as to emit an instantaneous electrical signal when, for example, a seed passes between the photocell 38 and light source 36 independent of environmental conditions such as accumulation of dirt, temperature changes, component aging, etc.

Figure 8:
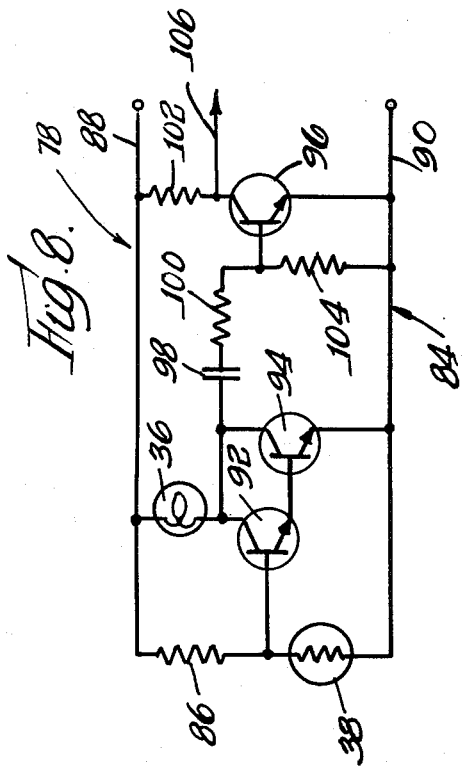
FIG. 8 is an electrical schematic view of a second embodiment of a detection circuit incorporating features of the present invention.

Turning to FIG. 8, a second embodiment of a self regulating electrical circuit 78 for the detecting device 26 is shown. The circuit 78 includes light source 36, photocell 38 and a modified amplifier circuit or amplifier switching circuit 84. The photocell 38 is connected in series with a resistor 86, both of which are connected across input terminals 88 and 90 which in turn are connected across a power supply (not shown). The amplifier switching circuit 84 includes three transistors 92, 94 and 96 respectively. The transistor 92 has its base connected intermediate photocell 38 and resistor 86, its emitter connected to the base of transistor 94 and its collector connected to one side of light source 36. The other side of light source 36 is connected intermediate the resistor 86 and input terminal 88. The transistor 94 in addition to having its base connected to the emitter of transistor 92, has its emitter connected intermediate the photocell 38 and input terminal 90, and its collector connected intermediate light source 36 and the collector of transistor 92. The collector of transistor 94 is also connected to the base of transistor 96 through a capacitor 98 and resistor 100. The transistor 96 in addition to having its base connected to the collector of transistor 94, has its emitter connected to the input terminal 90, and its collector connected through a resistor 102 to input terminal 88. A resistor 104 is provided for connecting the base and emitter of transistor 96. An output terminal 106 is connected intermediate the collector of transistor 96 and resistor 102.

In operation, momentary changes in ambient light level on photocell 38 due to interruptions by moving objects such as seeds causes instantaneous or momentary changes in the internal resistance of the photocell which in turn changes the direct current voltage applied to the amplifier switching circuit 84. These momentary changes in the voltage are amplified by transistors 92 and 94 and further amplified by transistor 96 for developing an output signal frequency at output terminal 106 of the same type described with respect to FIG. 7.

Apart from a decrease or change in ambient light level due to reasons described above, a decrease may occur due perhaps to a build up of dirt or the like in the light path which in turn causes the photocell resistance to increase. This increases the voltage on the base of transistor 92 which in turn causes an increase in the current through light source 36. An increase in current through the light source 36 increases the illumination thereof and compensates for any dirt or dust build up in the air or on the light source or the photocell 38 so that the ambient light level illuminating photocell 38 is maintained at a fixed level regardless of the dirt build up or the like. It is to be understood that while the transistor acts in the same manner when an object passes between the light source 36 and photocell 38 as it does when dirt builds up, the former is for a very short or instantaneous period. The thermal inertia of a typical incandescent lamp such as light source 36 prevents appreciable changes in brightness with such a momentary or instantaneous change in transistor 92 so that object detection is maintained with minimum or no loss in sensitivity of light source 36.

Turning to FIG. 9, a first embodiment of an electrical circuit 108 of the monitoring device 44 is shown. The monitoring device 44 is utilized for monitoring the flow rate of seeds detected by one of the detecting devices 26 described above and is shown in combination with a device 110 for counting the seeds.

The monitoring device electrical circuit 108 includes two input terminals 111 and 112 which are connected to a direct current power supply (not shown) through a manual on-off switch 115, which power supply supplies power to the monitoring device electrical circuit and which switch connects and disconnects the power supply from the monitoring device electrical circuit. The monitoring device electrical circuit includes basically three functional circuits, a first power regulating circuit 114 which is connected across the input terminals 111 and 112, a second monitoring signal developing circuit 116 which is connected to the output of circuit 114, and a third amplifier switching circuit 118 which is connected to the first two circuits.

The first circuit 114 is provided for regulating and adjusting power to be supplied to the second circuit 116 and also for regulating power utilized for operating associated detecting devices 26 described above. While this will become more clear hereinafter, it is to be understood that either embodiment of detecting device 26 as described above may be used with the monitoring device 44.

The second circuit 116 is utilized for developing a first or monitoring signal which is proportional to the set flow rate of seeds leaving a corresponding assembly bin or hopper 19 of seed planter 12 as described above. This first signal co-operates with the output signals of the above described detecting device 26, which output signal is proportional to the actual or detected flow of seeds from a corresponding bin assembly of hopper 19 as described above. The two signals are combined for developing a third or operating signal which is proportional to the difference between the set seed flow rate and actual or detected seed flow rate.

The third circuit 118 as stated above is connected to the output of circuit 116 and is responsive to the previously mentioned third or operating signal and energizes a corresponding indicating lamp 48 and the audible indicating device or alarm 50 as described with respect to FIG. 6 when the detecting flow rate goes below the set flow rate. It is to be understood that a circuit 116 and a circuit 118 is provided for each planting unit 16, which planting unit is described with respect to FIG. 1.

The second circuit 116 includes an adjustable resistor 120, a resistor 122 and a capacitor 124 all of which are connected in series. The otherwise free end of resistor 120 is connected through a common lead 126 to a terminal 128, which terminal is connected to the first circuit 114 as will be described hereinafter. The common lead 126 is also connected to a plurality of circuits 116 (not shown) which circuits correspond to other planting units 16. An input terminal 130 is connected intermediate the resistors 120 and 122 and is also connectable to the output of an above described detecting device 26.

As stated above, the circuit 116 produces a first signal. Due to capacitor 124, this signal is a positive going saw tooth signal which is returned to minus each time a signal from the detecting device appears at input terminal 130. The result of combining the first or monitoring signal and the output signal from the detecting device 26 is the previously mentioned third or operating signal which is a saw tooth signal having an amplitude dependent upon the detector output signal frequency as described above or in other words the amount of seeds actually detected in a given period of time. The amplitude of this saw tooth signal corresponds to or in proportional (either directly or inversely) to the difference between adjusted seed flow rate and actual or detected seed flow rate and is filtered and delayed by a resistor 132 and capacitor 134 resulting in a proportional direct current voltage signal which is to be utilized by circuit 118 as will be described in more detail below. The resistor 132 and capacitor 134 are connected in series across the capacitor 124.

The circuit 118 includes three transistors 136, 138 and 140 respectively. The transistor 136 is provided for amplifying the last mentioned direct current signal and applying this amplified signal to the base of transistor 138 which transistor in conjunction with transistor 140 forms a Schmitt trigger circuit. The circuit 118 also includes resistors 142, 144, 146, 148 and 150 which are appropriately connected so that the transistor 138 is "on" and transistor 140 is "off" when the amplitude of the signal applied to the base of transistor 138 corresponds to the actual seed flow rate being equal to or greater than the adjusted seed flow rate. This as stated above is dependent upon the value of the first or monitoring signal and the detector output signal frequency. If the actual seed flow rate goes below the set or adjusted seed flow rate, the detector output signal frequency applied to input terminal 130 will decrease causing the amplitude of the saw tooth wave or operating signal to increase which in turn will turn "off" transistor 138 and turn "on" transistor 140.

Directing attention to the actual electrical connections of circuit 118, transistor 136 has its base connected intermediate the resistor 132 and capacitor 134, its collector connected through resistor 142 to a common lead 152 and its emitter connected through resistor 144 to the circuit 114 as will be described hereinafter. The common lead 152 is also connected in like manner to the remaining identical circuits 118 (not shown). The transistor 138 has its base connected to the collector of transistor 136 and also to a common lead 154 through resistor 148. The common lead 154 also connects the otherwise free sides of capacitors 124 and 134 respectively and in like manner connects the other circuits 118. The collector of transistor 138 is connected to common lead 152 through resistor 146 and is also connected to the base of transistor 140. The emitter of transistor 140 is connected to the emitter of transistor 138 and also to common lead 154 through resistor 150. The collector of transistor 140 is connected to one side of an indicating light 48 which as stated above corresponds to one planting unit 16. The other side of indicating light 48 is connected to common lead 152.

A transistor 156 has its base connected through a resistor 158 to a point intermediate the collector of transistor 140 and indicating light 48, its emitter connected to common lead 152 and its collector connected to one side of an audible indicating device or alarm 50 (not shown) through a terminal 160. The other side of the audible indicating device or alarm 50 is connected through terminal 162 to the common lead 154. When the transistor 140 is "on", as described above, the indicating light 48 is energized to visually indicate that the actual flow rate is below the adjusted or set flow rate. This in turn actuates transistor 156 through resistor 158 for energizing the audible indicating device or alarm 50 and therefore audibly indicates that the actual or detected seed flow rate is below the set seed flow rate. It is to be understood that although there is only one transistor 156 for the entire monitoring device 44, resistor 158 is repeated for each planter unit 16 as is circuit 118.

The circuit 114 provides a potentiometer 164 which is utilized to readjust the positive going saw tooth signal or monitoring signal developed by resistors 120 and 122 and capacitor 124 when the set seed flow rate is changed so that the monitoring signal remains proportional to the new set seed flow rate. This also compensates for a variation or a change in the detector output signal frequency at input terminal 130, which change is due to the changed detected seed flow rate and which changed detected seed flow rate is caused by a change in the set seed flow rate. Thus, the previously mentioned third or operating signal applied to circuit 118 is maintained for control thereof as described above. In other words, while the set seed flow rate is changed from for example 400 seeds per minute to 200 seeds per minute which in turn decreases the amount of seeds detected and therefore the detector output signal frequency, a change in the monitoring signal will compensate for these changes so that the monitoring device 44 operates in the same manner as described above but at the new set flow rate.

The potentiometer 164 has its movable tap connected to the terminal 128, one side of its resistance connected through a terminal 166 and resistor 168 to a common lead 170, and the other side of its resistance connected to a terminal 172. The high end of potentiometer 164 is connected through the terminal 172 intermediate two series connected resistors 174 and 176 which comprise a voltage dividing network. The otherwise free side of resistor 174 is connected through a diode 178 to the input terminal 111 of the monitoring device electrical circuit 108. The otherwise free side of resistor 176 is connected to a point 180 regulated at approximately plus 9 volts, the point being regulated by a zener diode 182. This results in a change of potentiometer voltage with change in power supply voltage which compensates for effects caused by a change in power supply voltage, i.e. fluctuations, so that the calibration of the potentiometer is accurately maintained.

The above described voltage regulation at point 180 is brought about by connecting the cathode of zener diode 182 to point 180 and connecting its anode to a common lead 184 which common lead is connected to the input terminal 112 of the monitoring device 44. A filtering capacitor 186 is connected across the zener diode 182.

The circuit 114 also includes a transistor 188 which has its base connected to the cathode of zener diode 182, its emitter connected to a terminal 190 a its collector connected through a resistor 192 to a common lead 194. The common lead 194 is connected through the diode 178 to the input terminal 111. The input terminals 54 and 56 of an above-described detecting device 26 may be respectively connected to the terminals 190 and 184 respectively so that the power supply of monitoring device electrical circuit 108 simultaneously provides power to the detecting device 26 as well as the monitoring device 44. The transistor 188 and associated components operate as an emitter follower on zener diode 182 to supply a regulated voltage to the detecting device 26 which regulated voltage is maintained at a level to maintain long life of the detecting device's associated light source 36.

A transistor 196 has its collector connected to the point 180, its emitter connected through a diode 198 and a resistor 200 to the common lead 170, the emitter also being connected through diode 198 and resistor 144 to the emitter of transistor 136. The base of transistor 196 is connected through an adjustable tap to a resistor 202, which resistor is connected at one side through a resistor 204 to the collector of transistor 196. The other side of resistor 202 is connected through a resistor 206 to the common lead 170.

Transistor 196 and associated components operate as a voltage control, sensitive to the temperature affect on the transistor junction voltage, with the voltage output of transistor 196 applied as a voltage source to the emitter of transistor 136. This balances out temperature affects on transistor 136 so that the operating point of that transistor is maintained relatively independent of ambient temperature.

The electrical circuit 108 representing the monitoring device 44 is completed by a capacitor 208 which is connected on one side to common lead 194 and on the other side to common lead 184. The common leads 184, 170 and 154 are connected together while the common leads 194 and 152 are connected together.

In operation, the operator will first select the amount of seeds he desires to have released from the bin assembly or hopper 19 for a given period of time, for example 400 seeds per minute. This is referred to as the set or adjustable seed flow rate as stated above. As each seed is detected by an above described detecting device 26 corresponding to the particular bin assembly or hopper 19, a signal of short duration appears at the input terminal 130 as stated with respect to FIG. 9, a plurality of these signals within a given period of time being referred to as the detector output signal frequency. These signals by themselves will cause the transistor 138 to be "off" and the transistor 140 to be "on" so that the indicating light 48 and audible indicating alarm 50 is energized as described above. The operator must then adjust the potentiometer 164 until the previously mentioned first or monitoring signal is of such a magnitude so as to co-operate with the detector output signal frequency applied to the input terminal 130 for turning "on" transistor 138 and turning "off" transistor 140 and therefore de-energizing the indicating light 48 and audible indicating alarm 50. As long as the bin assembly or hoppers 19 are feeding seeds at the rate set by the operator the corresponding indicating light 48 and the audible indicating alarm 50 will remain de-energized. If a particular bin assembly or hopper 19 begins to feed less seeds than the rate set, the frequency of the output signal of an associated detecting device will decrease causing an increase in amplitude of the previously mentioned third or operating signal applied to circuit 118 which in turn will energize a corresponding indicating light 48 and the audible indicating alarm 50.

Turning to circuit 110 for counting seeds that are detected by the detecting circuit, the circuit 110 includes two output terminals 210 and 212 which are connected to an electro-mechanical or other type of digital counter (not shown), the circuit 110 utilized for driving the counter as will be described hereinafter. The circuit 110 also includes a terminal 214 which is appropriately connected to the terminal 128. A terminal 216 is also provided and is connected to a multi-positioned switch (not shown), which switch may be positioned to select a particular detecting device 26 corresponding to a particular bin assembly or hopper 19 so that the circuit 110 and digital counter counts the seeds released by the selected bin assembly or hopper.

Operationally, as each seed is released from the selected bin assembly or hopper 19 and detected by a corresponding detecting device 26 the output signal of the corresponding detecting device is delivered to the circuit 110. The circuit in the embodiment shown stores the first of every two signals fed thereto and energizes the counter due to the second signal and for a predetermined period of time so that the counter may count in multiples of two. This is done because of the mechanical speed limitations of the counter and the possibly short sequency between successive seeds.

In order to accomplish the above, the circuit 110 incorporates a binary storage arrangement utilizing transistors 218 and 220 as a divide by two flip-flop. A transistor 222 and associated components act as an amplifier for the signals applied from the detector device and each successive amplified signal reverses the conduction of transistor 218 relative to transistor 220. Transistors 224 and 226 form a one-shot multi-vibrator circuit with transistor 224 normally conducting and transistor 226 normally "off". A negative transition of the collector of transistor 220 is coupled in a manner described below to transistor 224 turning "off" transistor 224 and turning "on" transistor 226 which in turn supplies voltage to the counter for energizing the same. Transistors 224 and 226 are then held in this condition or state for approximately 30 milliseconds determined by the charging of a capacitor 228 through resistors 230 and 232. This provides a standardized counter on-time independent of the input pulse width, i.e. the length of each signal supplied from the output of the detecting circuit.

Referring now to the electrical connections of circuit 110, transistor 218 has its collector connected through a resistor 234 to the common lead 194 of monitoring device electrical circuit 108. Its emitter is connected to the emitter of transistor 220 and its base is connected through a terminal 236 and a resistor 238 to a common lead 240. The transistor 220 in addition to having its emitter connected to the emitter of transistor 218, has its base connected to the collector of transistor 218 through a parallel circuit comprising a resistor 242 and a capacitor 244. The base is also connected to the common lead 240 through a resistor 246. The collector of transistor 220 is connected through a resistor 248 to the common lead 194 and also is connected to the base of transistor 218 through a parallel circuit comprising a resistor 250 and a capacitor 252.

The transistor 222 has its base connected to terminal 216 through a capacitor 254 and a resistor 256, its emitter being connected to the common lead 240. The collector of transistor 222 is connected through a capacitor 258 and resistor 260 to terminal 214. The base of transistor 222 is also connected to a point intermediate the resistor 260 and capacitor 258. The collector is also connected to a resistor 262, the otherwise free side of resistor 262 being connected to the emitters of transistors 218 and 220 respectively.

Transistor 224 has its base connected through a diode 264, a capacitor 266 and a resistor 268 to the collector of transistor 220. A resistor 270 is connected on one side intermediate the capacitor 266 and diode 264 and on the other side to common lead 240. The resistors 230 and 232 are connected in series with the otherwise free end of resistor 232 being connected to the common lead 194 and the otherwise free side of resistor 230 being connected through capacitor 228 to the collector of transistor 226. A point intermediate the resistors 232 and 230 is connected to a point intermediate the base of transistor 224 and the diode 264. The emitter of transistor 224 is connected to the common lead 240 and the collector is connected to the base of transistor 226. The transistor 226 also has its base connected through a resistor 272 to common lead 194 and its emitter connected to common lead 240. The collector of transistor 226 is connected through a diode 274 to common lead 194. A capacitor 276 connects the base and collector of transistor 226 and a diode 278 has its cathode connected to common lead 194 and its anode connected intermediate resistor 230 and capacitor 228. The output terminal 210 is connected to common lead 194 while the output terminal 212 is connected intermediate the collector of transistor 226 and diode 274.

As each signal representing a detected seed is applied to the terminals 214 and 216, this signal is amplified by transistor 222 and its associated components. Each successive signal reverses the conduction of transistor 218 relative to transistor 220. Each time that the transistor 220 is turned "on" this causes the transistor 224 to be turned "off" which turns "on"- transistor 226. Transistor 226 is held in its "on" state for approximately 30 milliseconds as stated above which in turn maintains the electro-mechanical counter in an energized state for counting the seeds detected. As is apparent from the above description, only every other seed is actually counted and the electro-mechanical counter is adjusted so as to count by twos. It is to be understood that the circuit could easily be modified so that only one seed is counted for any predetermined plurality of seeds detected.

Figure 10:
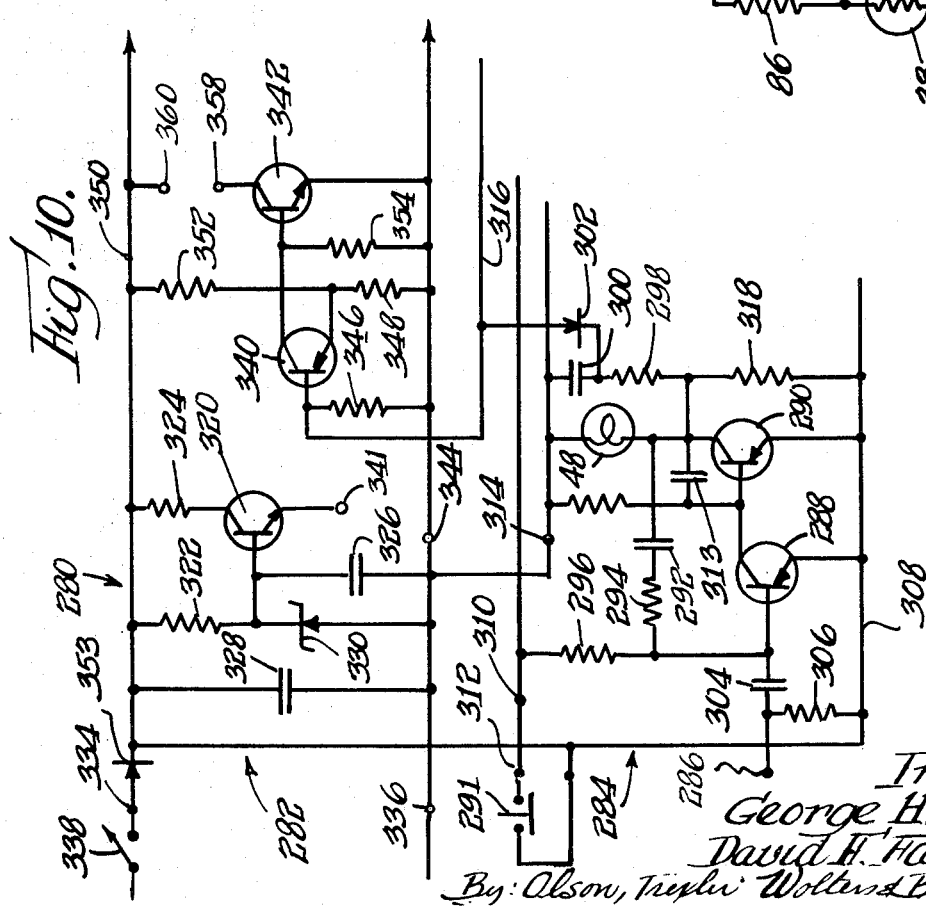

Turning to FIG. 10, a second embodiment 280 of a circuit for monitoring device 44 is shown. This monitoring device circuit is similar to the monitoring device electrical circuit 108 disclosed with respect to FIG. 9 in that it utilizes the output signals from an above described detector device 26 and also in that its power supply (not shown) not only supplies power to the monitoring device 44 but also to the detector device 26 in the same regulated manner as that disclosed with respect to monitoring device circuit 108. The circuit 280 differs, however, in that it continuously indicates or monitors the seed flow out of each bin assembly or hopper 19 rather than indicating when the actual seed flow rate goes below the adjusted or set seed flow rate as is the case of monitoring device circuit 108. That is to say, each time a seed is detected by its corresponding detecting device 26 and a signal is directed to the monitoring device 44, this signal causes a corresponding indicating light 48 to be energized. If any one of the indicating lights 48 continuously remains off for a predetermined period of time such as two or three seconds, the monitoring device 280 provides for energizing the audible alarm 50.

The electrical circuit 280 for monitoring device 44 includes a power regulating or first circuit 282 and an amplifier switching or second circuit 284, the circuit 284 being provided for each bin assembly or hopper 19.

The circuit 284 includes an input terminal 286 for connecting the output of an associated detector device 26, two transistors 288 and 290 respectively which form a one-shot multi-vibrator with transistor 288 normally held "on" and transistor 290 normally held "off" as will be described hereinafter, and a push button 291 which is utilized to test an associated indicating light 48.

Operationally, as a signal which corresponds to a detected seed is applied to input terminal 286, this signal is applied to the base of transistor 288 so that the transistor goes from its normally "on" state to a normally "off" state which in turn drives the transistor 290 from its "off" state to its "on" state. As long as the transistor 290 is maintained in its "on" state, current will pass through a corresponding indicating light 48 for energization thereof and thereby indicating the detection of a seed. The transistors 288 and 290 are then held in their respective "off" and "on" states by a capacitor 292 until the capacitor is charged through a resistor 294 and a resistor 296. This then turns transistor 288 back "on" after a predetermined period of time, turning "off" transistor 290. The predetermined period of time is set, primarily, to maintain the lamp in an on state long enough to give an adequate visual signal. A resistor 298 and capacitor 300 are used to integrate and delay the voltage across indicating light 48, the voltage being coupled through a diode 302 to the circuit 282 in a manner described hereinafter for energizing the audible indicating alarm 50 when the indicating light 48 is continuously de-energized for a predetermined period of time.

From the standpoint of electrical connections, the transistor 288 has its base connected to input terminal 286 through a capacitor 304. A resistor 306 is connected on one side to a point intermediate the capacitor 304 and input terminal 286 while its other side is connected to a common lead 308. The base is also connected to a point intermediate resistors 294 and 296 which are connected in series, the otherwise free side of resistor 296 being connected through a common lead 310 to a terminal 312. The otherwise free side of resistor 294 is connected through capacitor 292 to a point intermediate indicating lights 48 and the collector of transistor 290, which indicating light and collector are connected in series. The emitter of transistor 288 is connected to common lead 308 while its collector is connected to the base of transistor 290. A capacitor 313 is connected across the base and collector of transistor 290 and is provided so as to present triggering of the circuit by high frequency transience. The emitter of transistor 290 is connected through common lead 308 to the emitter of transistor 288. The collector of transistor 290 is addition to being connected to its base and to one side of indicating light 48, is also connected through resistor 298 to one side of capacitor 300 and one side of diode 302. The other side of capacitor 300 is connected to a common lead 314 while the other side of diode 302 is connected to common lead 316. It is to be understood that the common leads 308, 310, 314 and 316 are connected to each of the remaining circuits 284 (not shown) which correspond to respective hoppers 19. A resistor 318 has one side connected to the collector of transistor 290 and its other side connected to common lead 308 and is incorporated to maintain some indicating lamp current during the off-time of the lamp in order to reduce the in-rush current and maintain longer lamp life.

The regulating circuit 282 includes a transistor 320, two resistors 322 and 324 respectively, two capacitors 326 and 328 respectively, and a zener diode 330 all of which form a circuit for regulating the power to the detecting circuit in the same manner described with respect to monitoring device 44. It will suffice to say that the input terminals of each detecting device 26 is connected to terminal 341 and terminal 344 as the terminals are shown in FIG. 10. It is to be noted that in addition to terminal 334 an input terminal 336 is also provided by the monitoring device 44 both terminals being connected across a power supply (not shown) and through a switch 338 as in the case of monitoring device 44.

The circuit 282 also includes a DC amplifier circuit comprising transistors 340 and 342 which in conjunction with their associated components as will be described below are used to energize the audible indicating alarm 50. Particularly, as stated above, when the indicating light 48 is "on" or energized, the transistor 340 is maintained in its "off" state which in turn maintains transistor 342 in its "off" state. After the indicating light 48 is "off" for a predetermined period of time, which period of time depends upon the values of capacitor 300 and resistor 298, the transistor 340 is turned "on" which turns "on" transistor 342 for energizing the indicating or audible indicating alarm 50.

The transistor 340 has its base connected to common lead 316 and also to a common lead 344 through a resistor 346. The common lead 344 is connected to the input terminal 336. The emitter of transistor 340 is connected through a resistor 348 to common lead 344 and its collector is connected to the base of transistor 342. A resistor 352 is connected on one side to a common lead 350, which lead is connected through a diode 353 to terminal 334. The other side of resistor 352 is connected to the emitter of transistor 340.

The transistor 342 has its base connected to both the collector of transistor 340 and to common lead 344 through a resistor 354. The emitter of transistor 342 is connected to common lead 344 while its collector is connected to a terminal 358. The audible indicating alarm 50 is connectable on one side to the terminal 358 and on the other side to a terminal 360, which terminal is connnected to common lead 350. As is apparent when transistor 342 is in its "on" or conductive state, the circuit through the audible indicating alarm 50 is closed and therefore energizes the audible indicating alarm.

It is to be understood that a counting circuit identical to circuit 114 described with respect to FIG. 9 may be electrically and appropriately connected to the monitoring circuit 280 in the same manner as described with respect to FIG. 9 so that each detected seed may be counted.

While particular embodiments of the invention have been shown it should be understood, of course, that the invention is not limited thereto, since many modifications may be made; and it is, therefore, contemplated to cover by the appended claims any such modifications that fall within the true spirit and scope of the invention.

The invention is claimed as follows:

1. A seed monitoring apparatus for installation with a seed planter that is pulled by a tractor, the planter having at least one bin assembly means for releasing a plurality of seeds at a preselected numerical rate, said monitoring apparatus comprising: a housing for receiving seeds from said bin assembly, said housing constituting a chute and forming a path of travel for the passage of seeds therethrough, detecting means for electrically detecting said plurality of seeds, said detecting means including a source of light mounted on one side of said path of travel and a photocell mounted on the other side of said path of travel optically aligned with said source of light, said source of light and said photocell each being mounted on said housing, said detecting means also including circuit means for effecting from said photocell the emission of an electric signal responsive to momentary change in the light level on the photocell due to passage of a seed between said photocell and said source of light; said circuit means preventing the emission of said electric signal from said photocell upon relatively gradual change in the light level thereon, said detecting means further including an amplifying circuit electrically connected to said circuit means by conductor means on said housing for amplifying said emitted electric signal, said amplifying circuit being located on said housing adjacent to said photocell and said circuit means to amplify said signal emitted from the photocell prior to distortion of said last-mentioned signal, and monitoring means electrically connected by a cable to said amplifying circuit and responsive to said amplified electric signal for monitoring said plurality of seeds, said monitoring means being constructed for mounting on said tractor for view when the tractor is operated to pull the seed planter whereby the cable may extend forwardly of the seed planter to the tractor over a substantial length which is extremely long as compared to the length of said conductor means.

2. An apparatus according to claim 1 wherein said monitoring means includes a counter for counting said seeds detecting by said detection means.

3. An apparatus according to claim 1 wherein said monitoring means includes a light source to be energized for visual indication in the event that the bin assembly means releases a plurality of seeds at a numerical rate less than said preselected numerical rate.

4. An apparatus according to claim 3 wherein said monitoring means include an audible alarm to be energized for audible indication in the event that the bin assembly means release a plurality of seeds at a numerical rate less than said preselected numerical rate.

5. An apparatus according to claim 1 wherein said monitoring means include a light source for visually indicating the detection of said seeds.

6. An apparatus according to claim 5 wherein said monitoring means include an audible alarm to be energized for audible indication in the event that said bin assembly means discontinues releasing said plurality of seeds.

7. A seed detecting and monitoring apparatus for installation in a seed planter having a seed bin with means forming a path of travel for seeds passing outwardly of the bin, a light source positioned on one side of said path of travel, a photocell positioned on the other side of said path of travel and optically aligned with said light source; said photocell providing an operating potential which changes when a seed passes between said photocell and said light source; an amplifier switching circuit electrically connected to said photocell and responsive to said change in potential for emitting an electrical signal therefrom, said switching circuit including automatic means for varying the intensity of said light source whereby said operating potential is maintained at a fixed level, a monitoring device for monitoring the passage of seeds passing between the light source and the photocell, and an electric cable for connecting the output of said amplifier switching circuit to said monitoring device.

8. An apparatus for detecting and monitoring seed particles passing from the seed bin of a planter comprising: means forming a path of travel for seeds passing outwardly of said bin, a light source positioned on one side of said path of travel, a photocell on the other side of said path of travel and optically aligned with said light source; said photocell providing an operating potential which changes when a seed passes between said photocell and said light source; an amplifier switching circuit electrically connected to said photocell and responsive to said change in potential for emitting an electrical signal therefrom, and said switching circuit including automatic means for varying the intensity of said light source, said automatic means comprising a transistor having a base, an emitter, and a collector, said light source being in a circuit including said collector and base, and said photocell being in a circuit that includes said base and said emitter such that an increase in photocell resistance due to dirt build-up on the light source, causes an increase in voltage at said base to increase the current through said light source.

9. A system for monitoring a selected rate of flow of discrete articles passing along a path of travel comprising: detection circuit means for detecting said rate of flow and emitting a first electrical signal that is proportional to an actual rate of flow of articles; circuit means electrically connected to said detection circuit means for emitting a second signal proportional to said selected rate of flow of said articles, said second signal cooperating with said first signal for emitting a third signal which is proportional to the difference between said selected rate of flow and said actual rate of flow of articles; and amplifier switching means responsive to said third signal and delivering a fourth signal in the event said actual rate of flow goes below said selected rate of flow for indication thereof.

10. A system according to claim 9 including a light source electrically connected to the output of said amplifier switching means, said light source being energized by said fourth signal for visually indicating when said actual flow rate is below said set flow rate.

11. A system according to claim 10 including an audible alarm electrically connected to the output of said amplifier switching means, said alarm being energized by said fourth signal for audibly indicating when said actual flow rate is below said set flow rate.

12. A system according to claim 9 wherein said circuit means includes means to re-adjust said second signal so as to be proportional to any desired selected rate of flow.

13. A system according to claim 9 including regulation circuit means for maintaining power from a source of power to said detection circuit means at a fixed level independent of fluctuations in said source of power.

14. A system according to claim 9 including regulation circuit means electrically connectable between a power supply and said circuit means for maintaining said second signal at a fixed level independent of fluctuations in said source of power.

15. A system according to claim 9 wherein said second signal is a positive going sawtooth signal which is returned to minus by said first signal and said third signal is a sawtooth wave signal having an amplitude dependent upon the frequency of said first signal.

16. A system according to claim 9 including means electrically connected with said detection circuit means for counting the articles detected by said detection circuit means.

17. A system according to claim 16 wherein said means for counting said articles includes means for counting only one article for a predetermined plurality of successive articles detected.

18. A system according to claim 17 wherein said predetermined plurality is two.

19. A system for monitoring discrete articles passing along a path of travel comprising: detection circuit means for detecting said articles and emitting a first electrical signal upon detection of each article; amplifier switching means electrically connected to said detection circuit means and responsive to said first signal for emitting a second signal; delay circuit means electrically connected to said amplifier switching means for maintaining said second signal for a predeterMined period of time independent of said first signal; and a light source electrically connected to the output of said amplifier switching means, said light source being energized by said second signal for visually indicating the detection of said articles.

20. A system according to claim 19 including audible circuit means for emitting an audible signal in the event said light source is maintained in a de-energized state for a predetermined period of time after once being energized.

21. A system according to claim 19 including means for counting said articles detected by said detection circuit.

* * * * *